Oct. 17, 1967     V. V. TIIKKAINEN     3,346,986
WEIGHTING MEANS FOR FISHING LINE
Filed Feb. 3, 1965
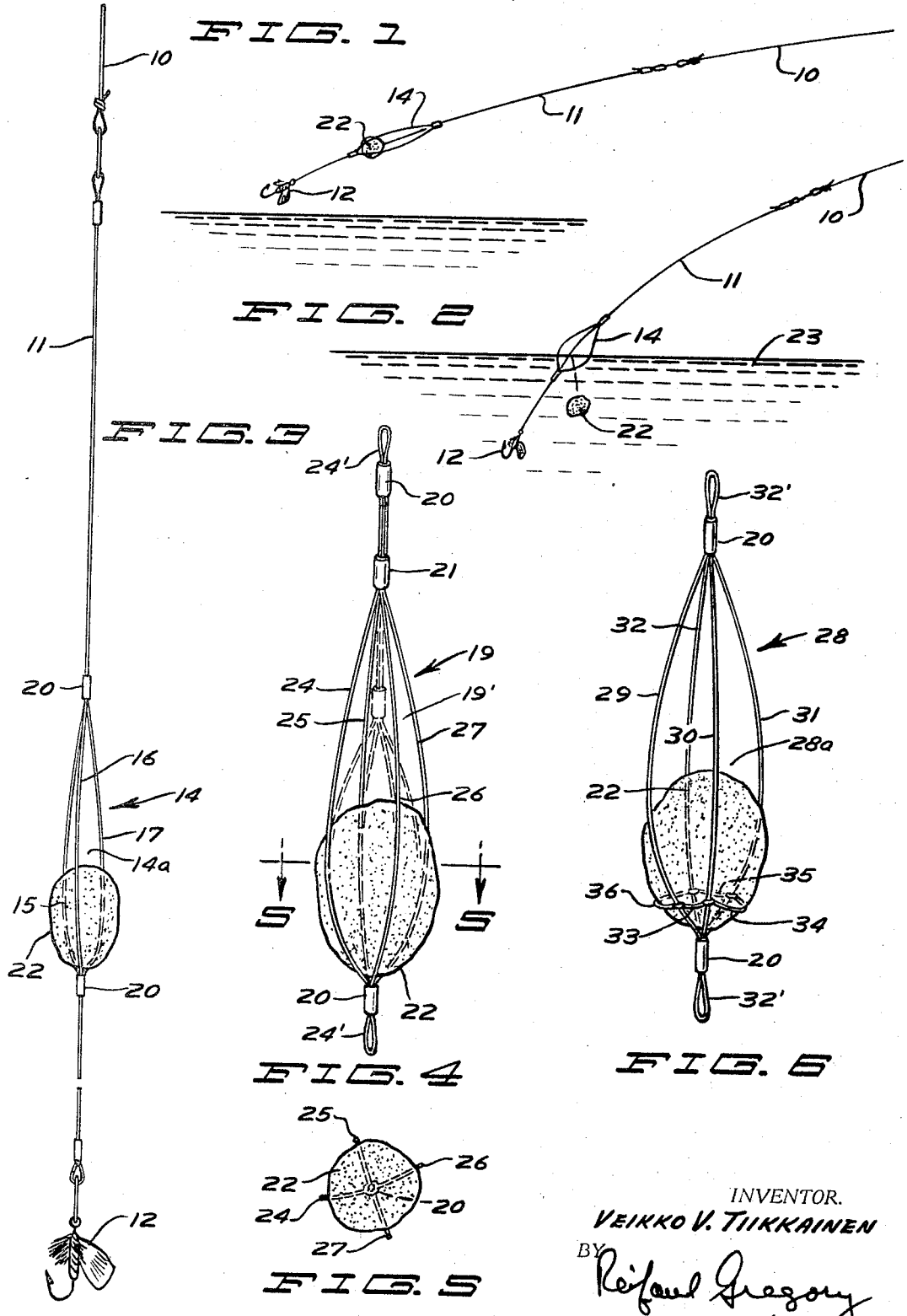
INVENTOR.
VEIKKO V. TIIKKAINEN
BY
Rifaul Gregory
ATTORNEYS

United States Patent Office 3,346,986
Patented Oct. 17, 1967

3,346,986
WEIGHTING MEANS FOR FISHING LINE
Veikko V. Tiikkainen, 4604 29th Ave. S.,
Minneapolis, Minn. 55406
Filed Feb. 3, 1965, Ser. No. 430,011
4 Claims. (Cl. 43—43.12)

ABSTRACT OF THE DISCLOSURE

A weight retaining attachment for a fishing line comprising a plurality of relatively short flexible strands disposed to naturally form an enclosure when separated and having integrally secured ends whereby a self removable weight is carried for casting a fishing line.

---

This invention relates to a retaining means for weighting a fishing line for casting purposes and, more particularly, to such a means arranged and adapted to have a weight drop free therefrom upon engagement of said means and said weight with the water.

Small lures such as wet and dry flies, small poppers, bugs, streamers, nymphs and the like require the weight of the fishing line for carrying means and generally cannot be cast with any fishing gear but a fly rod equipped with fly fishing line. Other types of fishing gear are not particularly adapted for casting extremely light weight lures. It is desirable to provide means for casting such a light weight lure with any type of a fishing rod, reel and line. Weighted floats are sometimes used for tihs purpose. Such floats, however, are not self detachable and are not satisfactory for the type of fishing using such a light weight lure as above indicated, and a lure of this type is used preferably without any attachment such as a weight or a float.

It is an object of this invention therefore to provide means in connection with a fishing line embodying a weight for casting a lighter-than-line lure with said means being adapted to be freed of said weight upon engagement with the water.

It is another object of this invention to provide a retaining means integral with a fishing line adjacent the free end portion thereof, said means being particularly adapted to receive and retain a weight during the process of casting the lure, but upon engagement with the water on the part of said means, said weight becomes disengaged therefrom and falls free of said line.

More specifically it is an object of this invention to provide in connection with a fishing line a relatively flexible weight retaining means in the form of a cradle or sling adapted to detachably receive a weight therein and to retain the same by the centrifugal force generated by the process of casting and upon engagement of said means with the water upon completion of the cast, said weight disengages itself from said means to drop into the water.

These and other objects and advantages of the invention will be set forth in the following description made in connection with the accompanying drawings in which like reference characters refer to similar parts throughout the several views and in which:

FIGS. 1 and 2 show in operation the invention herein on a reduced scale;

FIG. 3 is a broken view in elevation showing one embodiment of the invention in operating position;

FIG. 4 is a view in elevation showing on an enlarged scale another embodiment of the invention herein with an alternate position shown in dotted line;

FIG. 5 is a view in horizontal section on a reduced scale taken on line 5—5 of FIG. 4 as indicated; and FIG. 6 is a view in elevation on an enlarged scale showing another modification of the invention herein with a portion thereof being shown in dotted line.

Referring to the drawings and more particularly to FIG. 3, a length of fishing line 10 is shown having a leader 11 connected thereto in a conventional manner. Carried at the free end of said leader is a lure 12 shown in the form of a fly, and this lure is merely representative of extremely light weight lures characterized as lighter-than-line lures.

The invention herein comprises an enclosure such as a cradle or sling and is indicated generally by the numeral 14. It will be understood that the invention herein may be presented in independent form although it is here shown formed as an integral portion of said leader 11.

Said cradle 14 is suitably formed of a plurality of strands of flexible material of relatively small gauge such as of flexible leader or fishing line material. In the embodiment shown in FIG. 3, said cradle comprises three strands 15, 16 and 17. Strand 15 may be regarded as a portion of the line forming the leader 11. Thus said cradle in having the adjacent ends of its strands 16 and 17, respectively, secured together with the strand 15 by crimped sleeves 20 is integral with said leader. The lower portion of said cradle, as viewed in FIG. 3, is indicated as a basket portion 14a.

Positioned within said basket portion is a weight 22. Said weight may be in the form of a pebble of suitable size and of sufficient weight to carry the lure and line for the purpose of casting.

Operation

In preparing to cast, a convenient weight will be picked up and positioned in the basket portion 14a as shown in FIG. 3. The strands of said cradle should be sufficiently flexible to be held taut by said weight when in hanging position. During the course of the cast, the centrifugal force generated by the act of casting will maintain said weight within said cradle during the course of the flight of the lure as indicated in FIG. 1. Upon engagement of the weight with the water 23 and with the consequent stoppage of its flight, said cradle 14 will tend to collapse or that is to say, the strands will become relaxed, and then the weight will become self disengaged from said cradle and sink into the water 23, and the leader 11 will be free of this weight. The strands of the cradle will be of sufficient length to permit a pebble of suitable size to slip freely therebetween.

The normal fishing practice customary with a light weight lure may then take place.

Modification

With reference to FIGS. 4 and 5, a modification of the invention herein is shown. The modified cradle is indicated generally by the numeral 19 and is characterized principally in being shown in independent form.

Said device 19 comprises four strands 24–27 secured together at their respective ends by crimped sleeves 20. One of the strands such as strand 24 has its end portions extending through said sleeves and being doubled back therethrough to form a closed loop 24' at the outer end of each of said sleeves to which fishing line portions or more specifically, leader portions may be secured.

Embracing said strands adjacent one of said crimped sleeves 20 is a sleeve 21 adapted to be slidable along said strands to adjust the length of the area 19' between said strands, as illustrated in dotted line.

Operation

A fishing line or leader will be secured to said respective loops 24' in a conventional manner. A stone or pebble 22 of suitable size and weight will be inserted between the strands 24–27. The slidable sleeve 21 will be moved along said strands to adjust the extent of the area 19' to nicely accommodate the selected stone or pebble for retention of the stone or pebble during the cast and for a ready release of the stone upon completion of the cast as the cradle strikes the water.

The modification herein represents an improvement in improvement in the cradle structure in permitting a very nice accommodation for a range of weight sizes which may be used for casting.

*Modification*

With reference to FIG. 6, another modification of the cradle in FIG. 3 is shown and is indicated generally by the numeral 28.

The cradle 28 comprises strands 29–32 with said strands being secured together at their respective ends by crimped sleeves. One of said strands such as strand 32 will have its end portions extend through said sleeves and double back therethrough to form extended loop portions 32'.

The bottom or lower portion of said cradle 28 will carry the weight and this will be the end of the cradle adjacent the lure. Transverse strands are provided here to more specifically define an enclosure for a weight. Thus the cross strands 33–36, respectively, connect the longitudinal strands 29–30, 30–31, 31–32 and 32–29. Thus a pocket 28a is formed. Said cross strands will be located to assist in retaining a weight in the cradle but will not prevent the self disengagement of the weight from the cradle at the completion of a cast and upon engaging the water.

In operation, the cradle 28 is used in the same manner as the cradle 14 with a leader being secured to either end thereof.

Thus it is seen that I have provided a self detachable weight carried in a simply constructed cradle integral with a fishing line for casting lighter-than-line lures with any type of a fishing rod that may be desired.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:

1. A weight retaining means for a fishing line comprising
   a plurality of flexible strands of relatively small gauge material annularly positioned with respect to one another to naturally define an enclosure when spaced apart,
   means rigidly securing together in contact relationship the respective adjacent ends of said strands, and
   fishing line portions secured by said means at the respective ends of said strands in contact relationship therewith
   whereby said strands releasably retain a weight therebetween.

2. A weight retaining means for a fishing line comprising
   a plurality of flexible strands of relatively small gauge material disposed with respect to one another to form an enclosure when naturally spaced apart,
   a fishing line,
   one of said strands formed of a portion integral with said fishing line, and
   means rigidly securing together in contact relationship the respective adjacent ends of said strands
   whereby said strands are integral with said fishing line and are adapted to releasably retain a weight therebetween.

3. A weight retaining means for a fishing line comprising
   a plurality of elongated flexible strands of relatively small gauge material disposed to form an enclosure when naturally separated,
   means rigidly securing together in contact relationship adjacent ends of said strands, and
   means adjacent said last mentioned means for securing fishing line portions thereto.

4. A weight retaining means for a fishing line comprising
   a plurality of elongated flexible strands of relatively small gauge material disposed to naturally form a sling when separated,
   means at the respective ends of said strands rigidly securing the same together in contact relationship, and
   means intermediate said last mentioned means slidably embracing said strands to adjust the area of separation between said strands.

References Cited

UNITED STATES PATENTS

| | | | |
|---|---|---|---|
| 1,613,113 | 1/1927 | Leu | 43—44.4 |
| 1,796,877 | 3/1931 | Schultz | 43—44.4 |
| 2,982,049 | 5/1961 | Yost | 43—44.4 |
| 3,081,574 | 3/1963 | Wise | 43—43.12 |

FOREIGN PATENTS 70,614  12/1958  France.

SAMUEL KOREN, *Primary Examiner.*

WARNER H. CAMP, *Examiner.*